July 14, 1964  J. T. FERARA  3,140,620
DRIVE MECHANISM FOR MULTIPLE SHAFT MECHANISMS
Filed June 21, 1960

INVENTOR:
JAMES T. FERARA
BY
Howson & Howson
ATTYS.

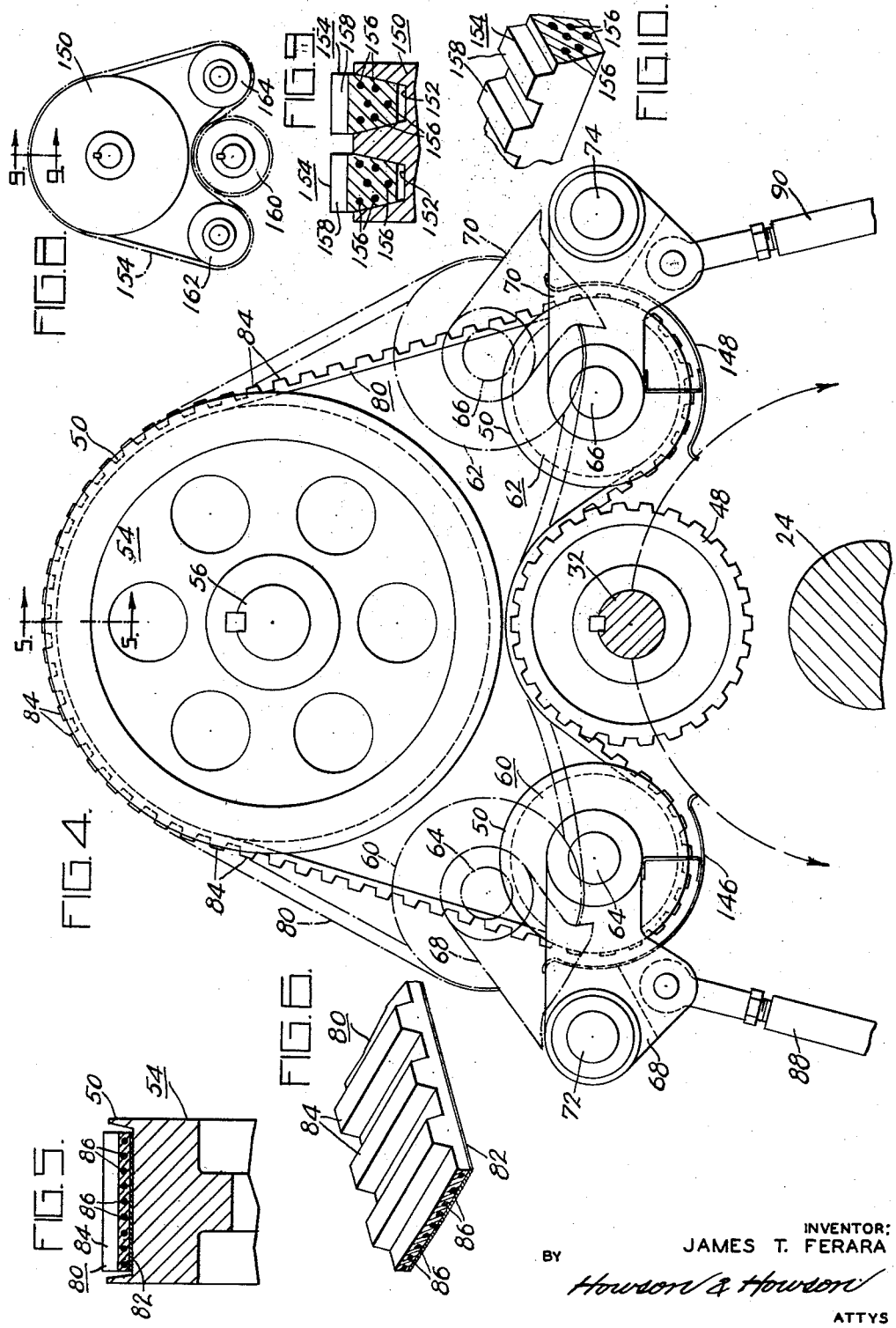

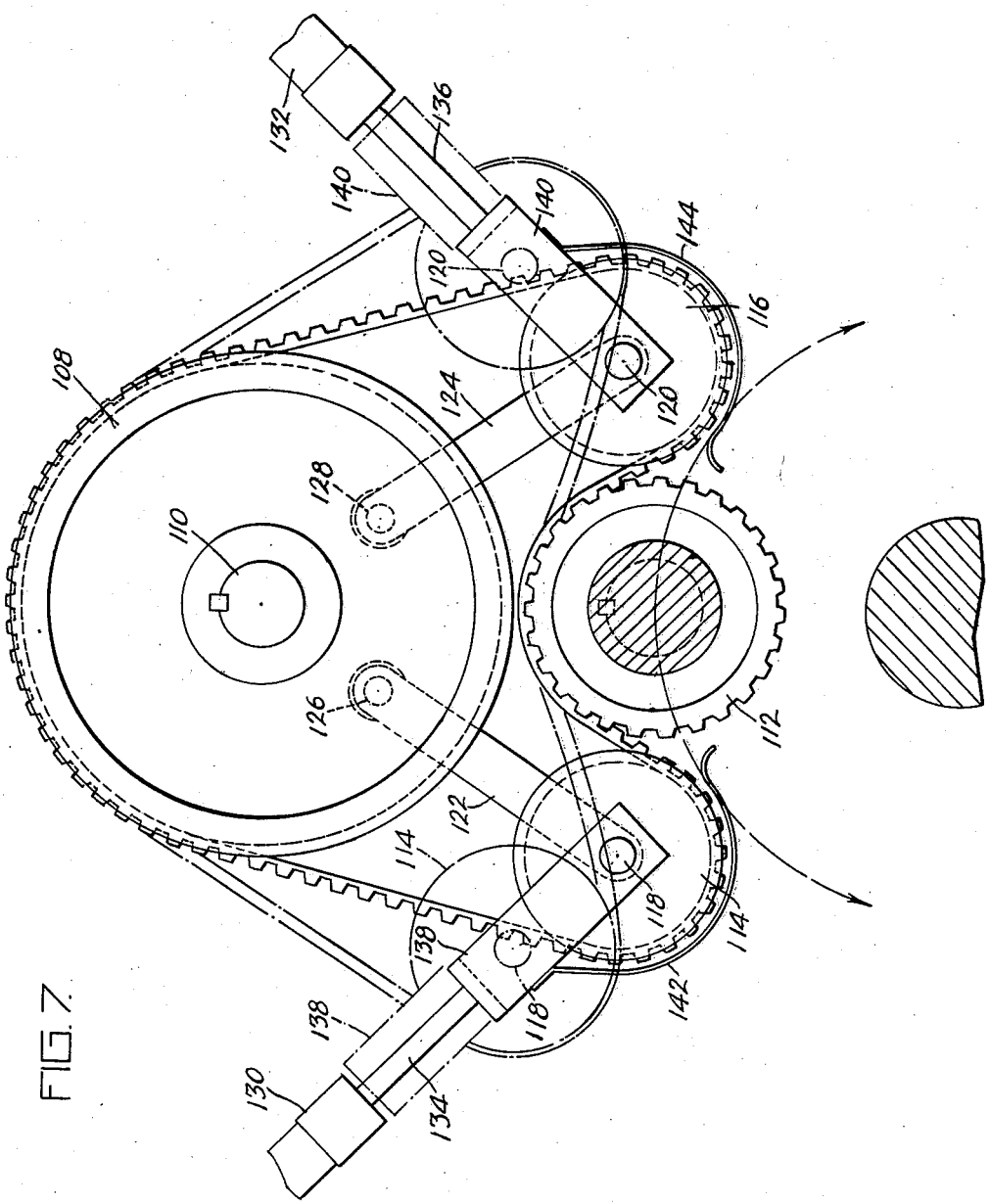

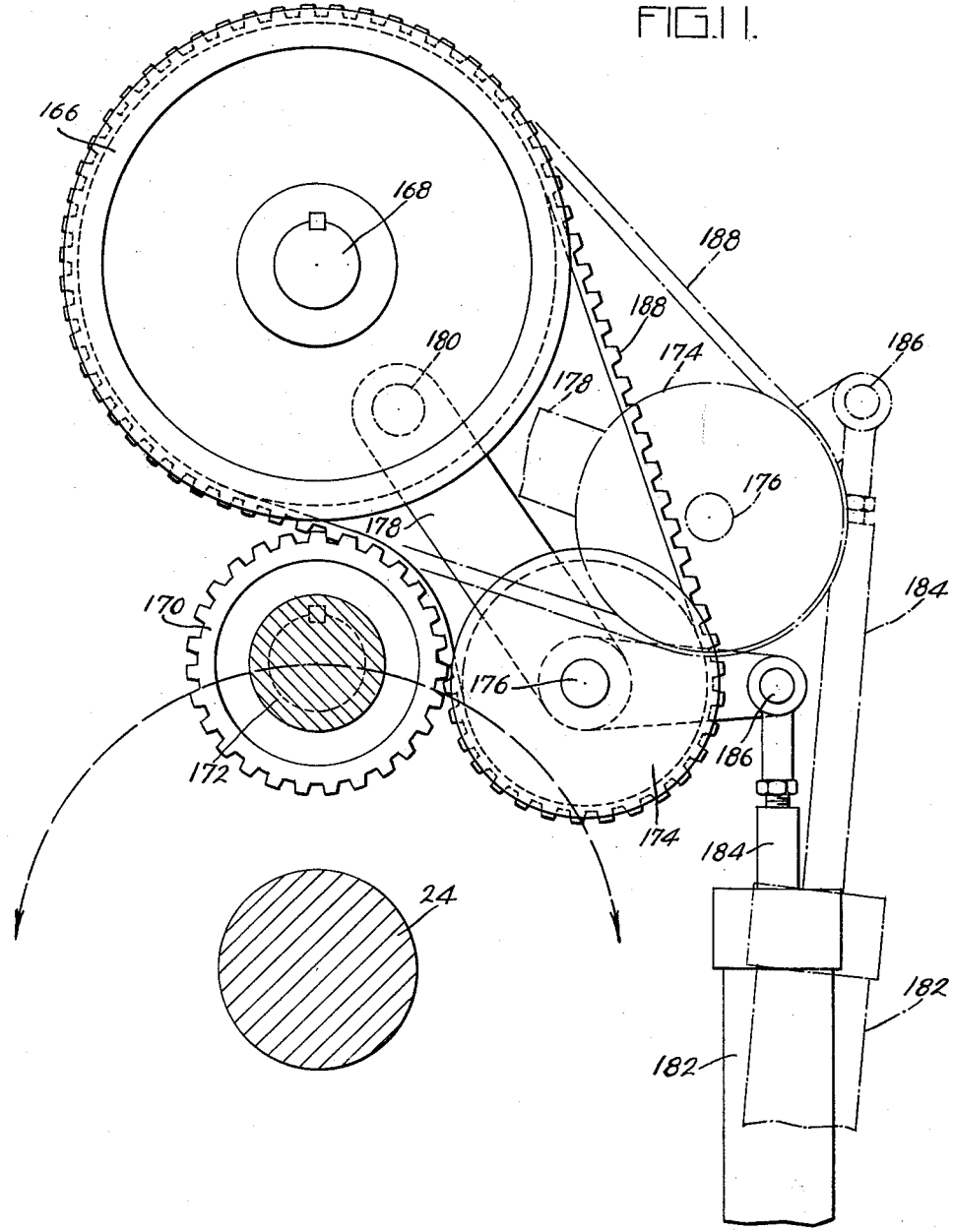

United States Patent Office 3,140,620
Patented July 14, 1964

3,140,620
DRIVE MECHANISM FOR MULTIPLE SHAFT MECHANISMS
James T. Ferara, Atco, N.J., assignor to Samuel M. Langston Company, Camden, N.J., a corporation of New Jersey
Filed June 21, 1960, Ser. No. 37,627
4 Claims. (Cl. 74—221)

The present invention relates broadly to an improved drive mechanism for driving one or more shafts or spindles of several sets of parallel shafts mounted on a common rotatable carrier or turret in a machine at uniformly spaced intervals, radially from the center axis of the carrier. The shafts in the carrier are adapted for rotation thereon through a circular path when the carrier is indexed and each shaft or set of shafts moves successively into a work station where driven by the drive mechanism of the present invention.

More specifically, the present invention relates to drive mechanism for driving the shafts of a multiple shaft slitter-scorer and the invention contemplates improvements over mechanism heretofore utilized for this purpose, such as shown in United States Patent No. 2,865,264, assigned to a common assignee with the present application.

The present invention provides mechanism permitting the successive placement into operative position of slitting and scoring shafts in a triplex slitter-scorer mechanism, with a minimum loss in time and eliminating the possibility of clashing gears when so positioning.

It is an object of the present invention to provide drive mechanism of the nature described, which eliminates disadvantages of previous known mechanisms such as U.S. Patent No. 2,865,264, which has for all practical purposes outmoded most other existing mechanisms and methods previously used to accomplish the purpose for which the present drive mechanism is intended.

In the mechanism shown in Patent 2,865,264, there is only a small area of friction surface between the pneumatic drive tire and the slitter-scorer shaft driving pulley when engaged so that due to a small amount of friction possible in use, this type drive is not positive.

Additionally, in this previously patented mechanism, an automatic clutch must be provided between the main line shaft driving the slitter-scorer and the slitter-scorer shaft pulley, or otherwise the pneumatic tire must slip until it has overcome the inertia of the slitter-scorer shafts and has brought them up to operating speed. In the absence of such an automatic clutch, excessive wear and frequent replacement of the pneumatic tire is necessitated.

It is accordingly a primary object of the present invention to provide a drive mechanism overcoming certain undesirable features in previously known and used mechanisms. To this end, the present mechanism insures a positive drive in that the slitter-scorer shaft drive pulley has teeth adapted to engage smoothly with timing belts having cogs and the timing belt is adapted to wrap around a main drive pulley with more than a sufficient arc of contact to insure positive action.

The structure and operation of the present invention are such that an automatic clutch is not required to prevent excessive wear from occurring on the timing belt used, and the timing belt can be provided with a smooth side which can slip on the main drive pulley until the starting inertia of the slitter-scorer shafts is overcome and they are brought up to operating speed. The slitter-scorer shafts can be readily brought up to speed in a very short period of time due to the large angle of contact between the timing belt used and the main drive pulley, and can be accomplished in the absence of overheating or producing wear on the belt. It is a further object of the invention to provide a drive mechanism which consists of conventional, commercially available, and inexpensive components in a certain arrangement and relationship one to another to accomplish the desired end results of the invention. For purposes of illustration of a workable embodiment of the invention, without being limited thereto, a drive mechanism as applied to a triplex slitter-scorer machine will be set forth hereinbelow. Manifestly, however, the present invention is applicable for other types of apparatus as will be readily apparent.

Further objects and advantages of the invention will be more readily apparent from the following detailed description thereof as applied to a triplex slitter-scorer machine, reference being made to the accompanying drawings in which:

FIG. 4 is an enlarged elevational view of the drive mechanism schematically shown in FIG. 3;

FIG. 5 is a fragmentary sectional view taken on line 5—5 of FIG. 4;

FIG. 6 is a fragmentary perspective view of one form of belt adapted for use in the drive mechanism of the invention;

FIG. 7 is an enlarged elevational view of a modified form of drive mechanism contemplated by the invention utilizing a different form of actuating members;

FIG. 8 is a schematic elevational view of a further modified form of drive mechanism;

FIG. 9 is an enlarged fragmentary sectional view on line 9—9 of FIG. 8;

FIG. 10 is an enlarged fragmentary perspective view of another form of drive belt contemplated by the invention; and FIG. 11 is an enlarged elevational view of a further modification of the invention.

With reference to the drawings, the machine therein illustrated comprises side frame members 20 and 22 in which is journalled a shaft 24. A hand wheel 26 is operatively connected with an end of shaft 24 by means of a screw, not shown, to afford a means for axially adjusting the shaft in the frame members, such adjustment being effected by manipulation of the hand wheel 26 in an obvious manner.

At the opposite end of shaft 24, within the side frame 22, gearing means are provided including a gear reduction unit, not shown, which connects the shaft 24 to apparatus and mechanism for rotation thereof as desired.

Figure 1:
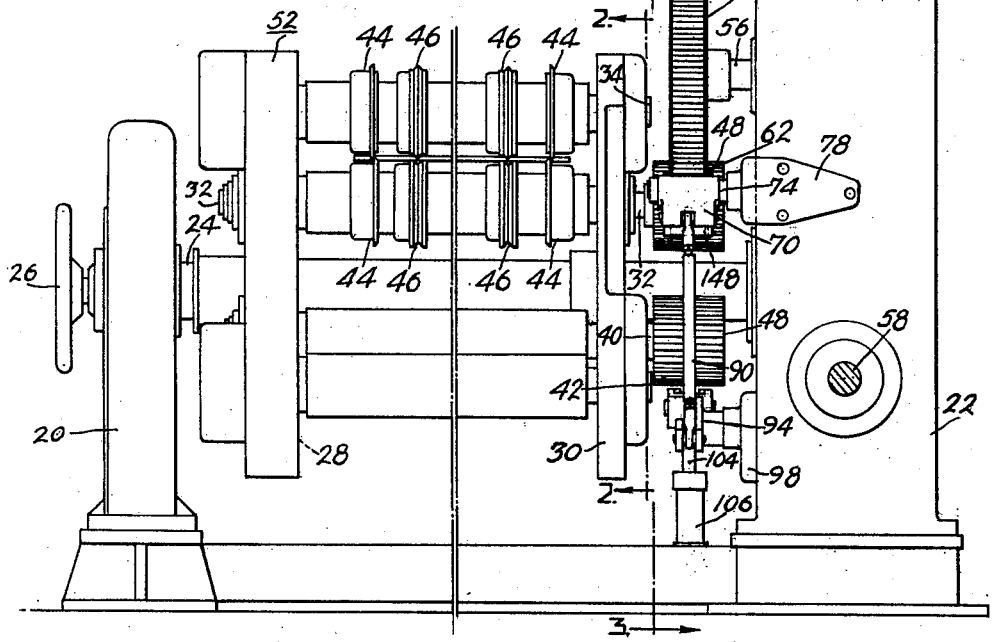
FIG. 1 is a front elevational view of a slitter-scorer machine having the drive mechanism of the present invention operatively associated therewith.
Figure 2:
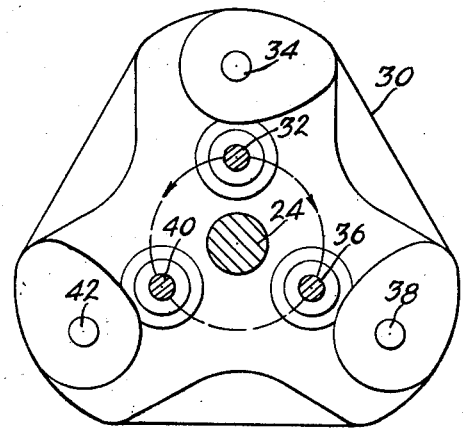
FIG. 2 is a view taken on line 2—2 of FIG. 1.

The shaft 24 has attached thereto axially spaced spiders 28 and 30. Journalled in the relatively aligned pairs of arms of these spiders respectively are three sets of shafts, the shafts of the respective sets being identified by the numerals 32, 34; 36, 38; and 40, 42. As shown in FIG. 1, these sets of shafts carry the web-working instrumentalities, in the present instance rotary slitter knives 44, 44 and rotary scoring elements 46, 46. The sets of shafts may be brought selectively to an operative position at the top of the machine by angular adjustments of the spider as described above. In the drawings, the shafts 32 and 34 are shown occupying an operative position for engagement with a strip of web stock, not shown, passing therebetween for engagement by the slitting and scoring elements. The presently inoperative sets of shafts 36, 38 and 40, 42 may in this interval be "made up" for subsequent desired operations of the web stock.

Each of the inner shafts 32, 36 and 40 of the respective sets has at one end substantially broad faced toothed pulleys 48 which are conventional timing belt pulleys having flanges on each end in one embodiment of the invention such as shown for example at 50 in FIG. 5 of the drawings, although the pulley shown in this figure is the main drive pulley which will be described hereinafter. Such flanges prevent the timing belt from weaving excessively and/or coming off the end of the pulley. This feature of the invention will appear in more detail hereinafter.

These toothed pulleys 48 provide a means for driving the shafts to which they are respectively connected. The two shafts of each set are connected for synchronized rotation by means of gears, not shown, secured to the opposite ends of the shafts within a housing 52 which also serves to cover the spider 28. Rotation of the inner shaft of each set is therefore accompanied by a corresponding but opposite rotation of the other shaft.

For driving the shafts as discussed above, a main drive pulley 54 is splined on shaft 56 which is rotatably journalled in side frame 22 and operatively interconnected with main line shaft 58 to be driven at the desired speed. The main drive pulley is also provided with flanges as shown at 59 in FIG. 5 although this drive pulley has a smooth peripheral surface. Idler pulleys 60 and 62 again of a flanged construction, are rotatably journalled on stub shafts 64 and 66 respectively carried on an arm of bell crank levers 68 and 70 which are pivotally mounted at 72 and 74 on mounting plates 76 and 78 secured on side frame 22. An endless timing belt 80 is so entrained around this combination of pulleys as to transmit the drive from main drive pulley 54 to the toothed pulleys associated with the respective shafts. This timing belt construction as shown in FIGS. 4, 5 and 6 is a conventional timing belt commercially available which has a special coating 82 on the smooth side and a plurality of cogs or teeth 84 transversely arranged extending from the opposite side thereof. The special coating on the smooth side is for the purpose of increasing traction. Tension members 86 are provided in the timing belt consisting of steel cables. This construction permits thinness and resultant flexibility to permit positive driving of the pulleys without generating heat or causing rapid wearing. This belt is suitable for fixed center drives because its length does not increase appreciably while in service due to the tension members being steel cables. The belt is commercially available and adapted for coacting with the toothed pulleys which are likewise conventional timing belt pulleys and which are commercially available. Means are provided for so moving the idler pulleys as to provide driving tension in the timing belt. Several types of mechanism can be utilized for this purpose. In that embodiment of the invention shown in FIGS. 3 and 4 of the invention, such means include adjustable arms 88 and 90 pivotally connected to the bell cranks 68 and 70 at a point removed from their pivotal mountings at 72 and 74. The opposite ends of arms 88 and 90 are connected to ends of levers 92 and 94 pivotally mounted on plates 96 and 98 secured to side frame 22 intermediate the ends of these levers. The opposing ends of the levers are provided with lost motion openings 100 through which a pin 102 extends and which pin is carried by piston rod 104 of a double acting air or fluid cylinder broadly designated 106.

The operation of the slitter-scorer when provided with this driving mechanism is as follows:

After an order is completed and the slitter-scorer, with a pre-set new set up, is to be indexed into place for the next order to be run, an electric cycling control functions and the air or fluid double acting cylinder upon operation, acts on each idler pulley through the lever arm arrangement described to raise each idler pulley and thus release the tension on the timing belt which ceases to drive the slitter-scorer shafts driving pulley. Simultaneously, the indexing of the slitter-scorer turret takes place. After the turret has completed its indexing to bring another pair of slitter-scorer shafts into operating position with respect to a web, the double acting air or fluid cylinder 106 swings the idler pulleys into the position shown in full lines in FIG. 4 which will then, by friction between the timing belt and main drive pulley 54, cause rotation of the slitter-scorer shaft in conjunction with the teeth thereon and in the timing belt. Consequently, the timing belt starts turning the slitter-scorer shafts. The main drive pulley 54 does not have to be stopped during the above-described sequence of events. The slitter-scorer shafts driving pulleys move smoothly into place under the loose timing belt and experience no difficulty in meshing with the cogs on the timing belt.

The design of this driving mechanism is such that the cogs on the timing belt mesh with the teeth on the slitter-scorer shafts driving pulleys and there is a large angle of contact between the smooth side of the main drive pulley and the timing belt. These design features insure a positive drive for the slitter-scorer shafts. It is also possible to reverse the belt set up and have the timing belt with the cogs meshing with the main drive pulley as will be readily apparent although the preferred form is that described in detail.

Figure 3:
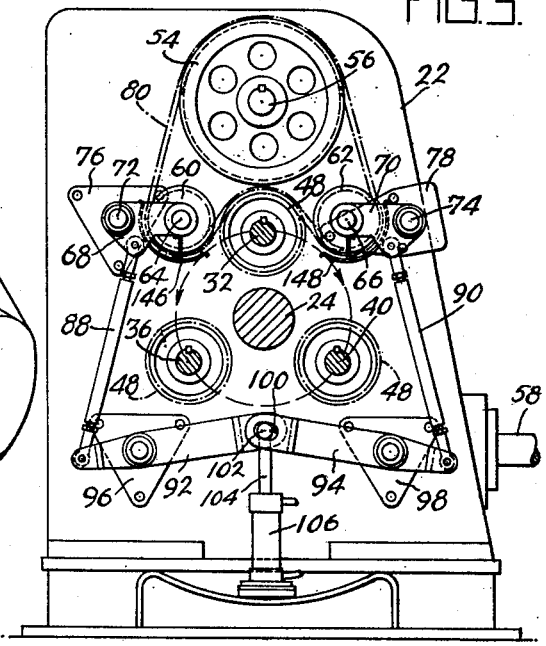
FIG. 3 is a view taken on line 3—3 of FIG. 1.

In the embodiment of FIG. 3, it is also possible to eliminate the cylinder mechanism 106, arms 92 and 94, and the associated mechanism, and substitute for arms 88 and 90 separate cylinders which would result in the same operation of tensioning or releasing tension on the timing belt.

A different embodiment for tensioning of the timing belt is shown in FIG. 7 of the drawings. Here, the main driving pulley 108 is again of the same smooth periphery flange construction splined on rotatable shaft 110. A toothed pulley 112 similar in construction to the pulleys 48 is mounted on the shaft 32 of the slitter-scorer. Smooth periphery flanged idler pulleys 114 and 116 are rotatably journalled on shafts 118 and 120 respectively carried on pivotally mounted arms 122, 124 suitably pivotally mounted at 126, 128 on the machine. Two double acting fluid cylinders 130 and 132 have their piston rods 134 and 136 connected to U-shaped members 138 and 140 which in turn are operatively connected with shafts 118 and 120. Upon actuation of the cylinders 130 and 132 to extended or retracted position, the idler pulleys will move into the belt tensioning position shown in full lines in FIG. 7 or to the belt loosening position shown in dotted lines in that figure. Operation of this embodiment is otherwise identical in result to the previously described one and the belt utilized in this form is also of the same character. It will be noted that belt guides 142 and 144 are provided in proximity to the idler pulleys for properly maintaining the belt in position during operation of the drive mechanism. Similar guide members 146 and 148 are provided in the embodiment of FIG. 4.

Another embodiment is shown in FIGS. 8-10 inclusive wherein the main drive pulley 150 is of the type having double V-shaped grooves 152 in the periphery thereof for coaction with spaced V-belts 154. Again tensioning members 156 extend through the belts for the purpose of taking the tension. The upper surfaces of these belts are provided with cogs or teeth 158 for coaction with a toothed slitter-scorer shaft pulley 160 and idler rolls or pulleys 162, 164 can be operatively mounted for action as in the previously discussed embodiments.

A further embodiment is shown in FIG. 11, which uses only a single idler pulley. The main drive pulley 166 is again of the same smooth periphery flange construction splined on rotatable shaft 168. A toothed pulley 170 similar in construction to the pulleys 48 and 112 is mounted on shaft 172 of the slitter-scorer. A smooth periphery flanged idler pulley 174 is rotatably journalled on stub shaft 176 carried on bell crank lever 178, suitably pivotally mounted at 180 on the machine. A pivotally mounted double acting fluid cylinder 182 has its piston rod 184 pivotally connected to the free end of bell crank lever 178 by pin 186. An endless cogged timing belt 188 is operatively associated with pulleys 166 and 174 and adapted for coaction with toothed pulley 170 in a manner similar to that of the other embodiments. Upon actuation of the cylinder 182 to extend or retract piston rod 184, the idler pulley 174 will move into or out of belt tensioning position shown in full lines in the drawing or belt loosening position shown in dotted lines. Operation of this embodiment gives identical operating results to those of the other described embodiments.

It will be apparent that several variations of the design can be utilized for tightening of the timing belt, and if desired, additional fine adjustment can be provided by the use of eccentric pins in each of the idler pulleys.

The fluid circuit for the double acting fluid cylinders can be controlled by any known conventional four-way solenoid valve which is connected into the same circuit with the turret indexing motor so that the idler pulleys are raised when the indexing motor starts up and are lowered when the indexing motor stops at the completion of the indexing cycle. Preferably, a time lag is utilized for applying air slowly to the cylinders so as to bring up to speed slowly without jarring or otherwise damaging the various components of the drive mechanism.

It will also be readily understood that the timing belt could be reversed with respect to the individual main drive and slitter-scorer shaft drive pulleys or that adjustable double cone type pulleys or the like can be utilized on either the main drive or the slitter-scorer shafts to permit an adjustability of speed feature, and various arrangements are contemplated within the present invention. It will be seen that in the various embodiments described the present invention insures a positive drive in that the slitter-scorer shafts drive pulley has teeth which engage smoothly with the timing belt teeth or cogs and the timing belt wraps around the main drive pulley with more than a sufficient arc of contact within the frictional co-efficient relationship therebetween. Operation is such that an automatic clutch is not required to prevent excessive wear from occurring on the timing belt since the smooth side of the belt can slip on the main drive pulley until the starting inertia of the slitter-scorer shafts is overcome and they are brought up to operating speed. This bringing up to speed of the slitter-scorer shafts can be accomplished in a very short time due to the large angle of contact between the timing belt and the main drive pulley and this can be done without overheating or producing wear on the belt.

Various minor modifications and changes can of course be incorporated in the present invention without departing from the spirit and scope thereof as defined in and limited solely by the appended claims.

I claim:

1. In a machine for slitting and scoring continuously moving web stock, a plurality of sets of shafts for slitting and scoring elements, a common rotary carrier for said shafts, said shafts being uniformly spaced radially from the rotary axis of said carrier so as to transcribe a common circular path as the carrier is rotated, said elements being selectively movable into operative position with respect to the web and out of operative position, a main drive pulley, drive pulleys for each seperate shaft, a flexible continuous toothed drive belt entrained partially about said main drive pulley, at least one idler pulley movably mounted with respect to said common drive pulley and adapted for engagement with said belt for tightening or loosening the same, said belt being engageable with said shaft drive pulleys, said shaft drive pulleys being toothed and having side flanges thereon, said main drive pulley having a smooth peripheral surface and side flanges, said belt having a friction enhancing coated smooth surface in driving engagement with the surface of said main drive pulley.

2. In a machine as claimed in claim 1, said idler pulley having a smooth periphery and being flanged on the sides.

3. In a machine as claimed in claim 1, endless steel cables in said belt comprising tension members permitting thinness and flexibility insuring positive driving from the smooth surfaced main drive pulley and positive driving of said toothed pulley in the absence of generated heat and rapid wear.

4. In a machine as claimed in claim 1, and including a fluid operated double acting cylinder operatively connected to said idler pulley to move said idler pulley into and out of tensioning contact with said belt.

References Cited in the file of this patent

UNITED STATES PATENTS

| | | |
|---|---|---|
| 2,437,850 | Dennis | Mar. 16, 1948 |
| 2,526,324 | Bloomfield | Oct. 17, 1950 |
| 2,743,679 | Lofton | May 1, 1956 |
| 2,760,378 | Van Deventer | Aug. 28, 1956 |
| 2,838,946 | Kiekhaefer | June 17, 1958 |
| 2,894,405 | Carle | July 14, 1959 |